G. BIGNELL.
LUBRICATOR.
APPLICATION FILED FEB. 16, 1920.

1,435,276.

Patented Nov. 14, 1922.

Inventor
Gerald Bignell

Patented Nov. 14, 1922.

1,435,276

UNITED STATES PATENT OFFICE.

GERALD BIGNELL, OF CHICAGO, ILLINOIS.

LUBRICATOR.

Application filed February 16, 1920. Serial No. 359,148.

*To all whom it may concern:*

Be it known that I, GERALD BIGNELL, a citizen of Canada, residing at Chicago, in the county of Cook and State of Illinois, have invented a certain new and useful Improvement in Lubricators, of which the following is a full, clear, concise, and exact description, reference being had to the accompanying drawings, forming a part of this specification.

This invention relates to improvements in lubricators.

In the present practice, it is customary to use so-called grease cups or lubricators for lubricating parts of machinery wherein the plunger rod of the grease cup is given a partial turn at predetermined intervals so as to place the grease or other lubricant within the container under extra pressure and thereby force the grease or lubricant through the discharge opening. Grease cups or lubricators of this character are not entirely satisfactory for the reason that the lubricant is placed under a comparatively heavy initial compression immediately upon advancement of the plunger so that, as the lubricant is gradually heated at the discharge opening, the lubricant will feed out too rapidly shortly after the plunger has been advanced and, toward the end of the period, before the plunger is next advanced, the lubricant will fail to properly feed. Furthermore, with grease cups or lubricators of the character indicated, the attention of the operator is required at comparatively frequent intervals and in the haste of advancing the plungers of the grease cups, the manipulation is not always uniform so that the lubricant is fed at different rates at different times.

The object of my invention is to provide a lubricator or grease cup or grease gun which will correspond in shape and size substantially with the usual commercial forms now on the market and which will be manually operated in substantially the same manner but wherein provision is made for temporarily storing a small quantity of the grease or other lubricant under the action of a spring or other expansible means so that the lubricant will be fed automatically and under a substantially uniform mild pressure during the entire intervals between advancement of the plungers.

More specifically, the object of my invention is to provide a lubricator or grease cup wherein is provided a temporary storage chamber having a spring pressed plunger therein and into which a small quantity of the lubricant is temporarily forced each time the main plunger of the grease cup is manually advanced whereby a more uniform and efficient delivery of the lubricant is obtained.

Figure 1:
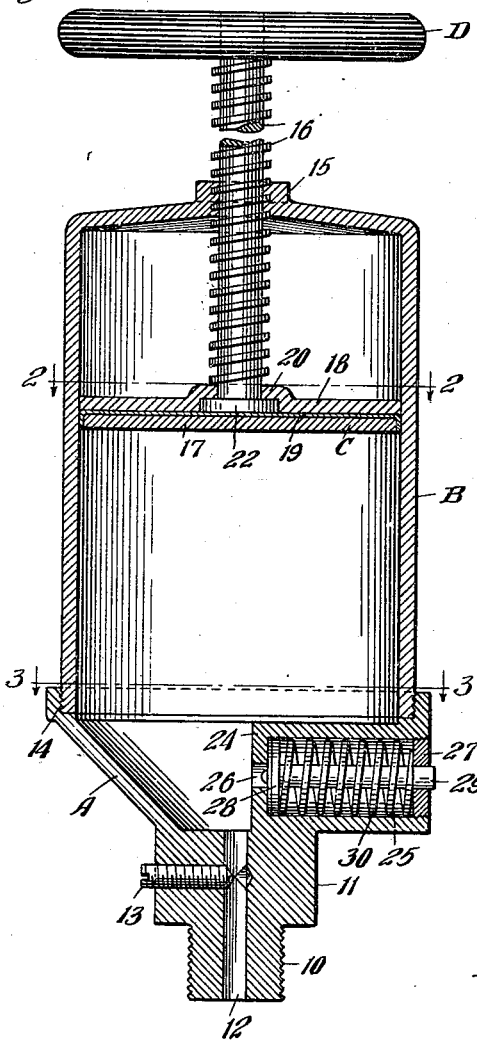
Figure 2:
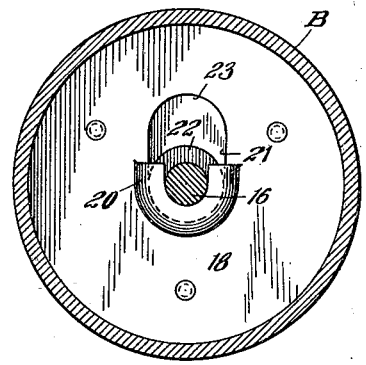
Figure 3:
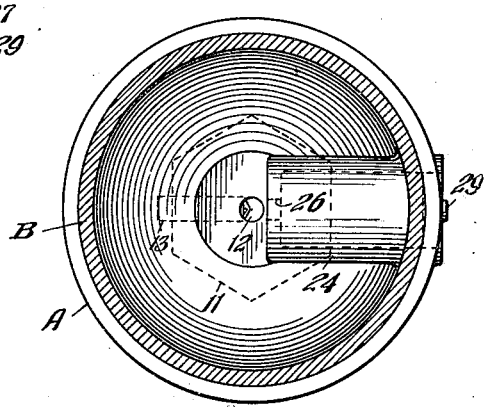

In the drawing forming a part of this specification, Figure 1 is a vertical sectional view of a lubricator or grease cup showing my improvements embodied therein. And Figures 2 and 3 are horizontal sectional views taken substantially on the lines 2—2 and 3—3 respectively, of Figure 1.

In said drawing, the lubricator or grease cup is shown as formed by a lower casting A, and a shell or casing B. Within the grease cup is provided a main plunger C adapted to be advanced manually by means of the hand wheel D.

The lower end of the casting A is threaded as indicated at 10 in order to adapt the grease cup for attachment to the proper part of the machine to be lubricated, the casting A being formed with a hexagonal cross section immediately above the threaded part as indicated at 11 to facilitate the use of a wrench. The lower part of the member A is provided with a delivery opening or a duct 12 of somewhat restricted area and through which the grease or lubricant is adapted to be discharged or delivered. The rate of delivery of the lubricant may be controlled by an adjustable throttle screw indicated at 13.

The casting A is preferably interiorly threaded at its upper end as indicated at 14 to receive the corresponding threaded lower end of the shell or casing B. The upper wall of the shell B is provided with the boss indicated at 15 which is provided with a threaded perforation to cooperate with the screw 16 which carries the hand wheel D at its upper end. The lower end of the screw 16 is swiveled to the plunger C which may be conveniently done by forming the plunger C with a lower disc 17 and upper disc 18 and an interposed washer or packing 19. The two discs 17 and 18 are rigidly united by riveting or otherwise suitably securing the same and the upper disc 18 has an upwardly offset centrally disposed flange indicated at 20 which is slotted as indicated at 21 to accommodate the shank of the screw 21, the flange 20 overhanging the annular flange 22 at the lower end of the screw 16. The upper disc 18 is cut away a suitable distance as indicated at 23 in order to permit the lower end of the screw 16 being slipped into place as will be understood.

In carrying out my invention, I preferably provide a temporary storage chamber in the casting A, the latter being suitably formed to provide a horizontally extending substantially cylindrical boss 24. The boss 24 may be bored or reamed so as to provide an interior cylindrical temporary storage chamber 25. The inner end of the temporary storage chamber has an opening 26 therein which, it will be noted, is located in relatively close proximity to the delivery opening 12. The outer end of the temporary storage chamber 25 may be closed by any suitable means such as the washer 27 threaded therein. A piston 28 is provided in the temporary storage chamber, said piston having a stem 29 guided in the washer 27, there being a coiled spring 30 interposed between the piston 28 and washer 27. In actual practice, the spring 30 will be made of relatively light caliber so as to readily admit the lubricant from the main chamber of the grease cup and also force the lubricant which is temporarily stored in the chamber 25 out gradually and with just sufficient pressure to permit the proper delivery from the opening 12.

In operation, the main chamber of the grease cup or lubricator which is provided by the members A and B, will be filled with the grease or other lubricant and the plunger C be disposed at the top of said main chamber. By giving the hand wheel a partial turn, as for instance a quarter turn, the piston or plunger C will be forced downwardly a slight amount, thereby putting the grease or lubricant in the main chamber under additional pressure. In actual practice, this pressure will not be great enough to compel the ejection of the lubricant at an abnormal rate through the opening 13 so long as the lubricant remains at normal temperature but the increased pressure imposed upon the lubricant by the advancement of the piston C will be sufficient to overcome the spring 30 and thereby permit a small charge of the lubricant to enter the temporary storage chamber 25. Thereafter, it is evident that the energy stored in the compressed spring 30 will be sufficient to gradually eject the lubricant temporarily stored in the chamber 25 out through the opening 26 as the lubricant is gradually delivered through the opening 12 to the machine being lubricated. With this construction, I obtain a very uniform feed of the lubricant and effect a large saving in the quantity of lubricant employed because in the older types of grease cups, the method of feeding has been extremely wasteful. Furthermore, I have found that the plunger of my improved grease cup need not be advanced as frequently as with the former types of grease cups, thereby requiring less attention on the part of the engineer or operator.

Although I have herein shown and described what I now consider the preferred manner of carrying out my invention, the same is merely illustrative and I contemplate all changes and modifications as come within the scope of the claims appended hereto.

I claim:

1. As an article of manufacture, a lubricator having a main storage chamber provided with a delivery opening, and means movable within and relatively to the storage chamber for applying pressure to the lubricator within said main storage chamber, said means having a part thereof extended outwardly of the chamber and manually operable from the exterior thereof, said lubricator being provided also with a smaller temporary storage chamber having communication with said main chamber between said pressure applying means and said delivery opening, said lubricator having means for gradually and automatically ejecting the lubricant from said temporary storage chamber into said main chamber.

2. As an article of manufacture, a lubricator consisting of a casting and a shell, said casting being provided with means for attaching it to a machine to be lubricated and formed also with a relatively small temporary storage chamber therein, the main storage chamber for the lubricant being provided by the said shell and a portion of said casting, means, movable within and relatively to the storage chamber formed by said casting and shell, for increasing the pressure on the lubricant within the main storage chamber, and means within said small chamber arranged to gradually and automatically eject the lubricant therefrom into the main chamber.

3. As an article of manufacture, a lubricator having a main chamber with a delivery opening at one end thereof and a temporary storage chamber having an admission and discharge opening in proximity to said delivery opening, said lubricator being provided with means for increasing the pressure on the lubricant within the main chamber to thereby temporarily force a portion of the lubricant into said temporary storage chamber, said lubricator having also means within the temporary storage chamber for automatically and gradually ejecting lubricant therefrom as the lubricant is gradually discharged from said delivery opening.

4. In a device of the character described, the combination with a casing providing a main storage chamber and having a delivery opening at one end thereof; of a plunger manually adjustable lengthwise of said chamber within the casing; a temporary storage chamber having means providing for the admission thereto and the ejection therefrom of lubricant; and a spring controlled plunger within said temporary storage chamber.

5. As an article of manufacture, a grease cup comprising a casing having a delivery opening at one end thereof, a hand operated plunger slidably mounted within the casing from the opposite end toward said delivery opening; and means in communication with the interior of said casing intermediate said plunger and the delivery opening and within which a portion of the lubricant may be temporarily stored under an expansive ejecting action when said plunger is operated to compress the lubricant at a rate faster than it is normally delivered through said delivery opening.

6. In a lubricator, the combination with a hollow casing providing a main storage chamber, said casing having a delivery opening and adapted to be attached to a machine to be lubricated; of a piston slidably mounted within said casing; manually operable means extending to the exterior of the casing for advancing said piston; a temporary storage chamber disposed adjacent said delivery opening and having an opening in communication with the interior of said casing; and a spring pressed plunger within said temporary storage chamber.

In witness that I claim the foregoing I have hereunto subscribed my name this 9th day of Feb., 1920.

GERALD BIGNELL.

Witness:
NELÁ SCHMIDT.